Dec. 5, 1939.     H. SEIBEL     2,182,681
APPARATUS AND METHOD OF REGAUGING DISTILLED SPIRITS
Filed Sept. 7, 1937
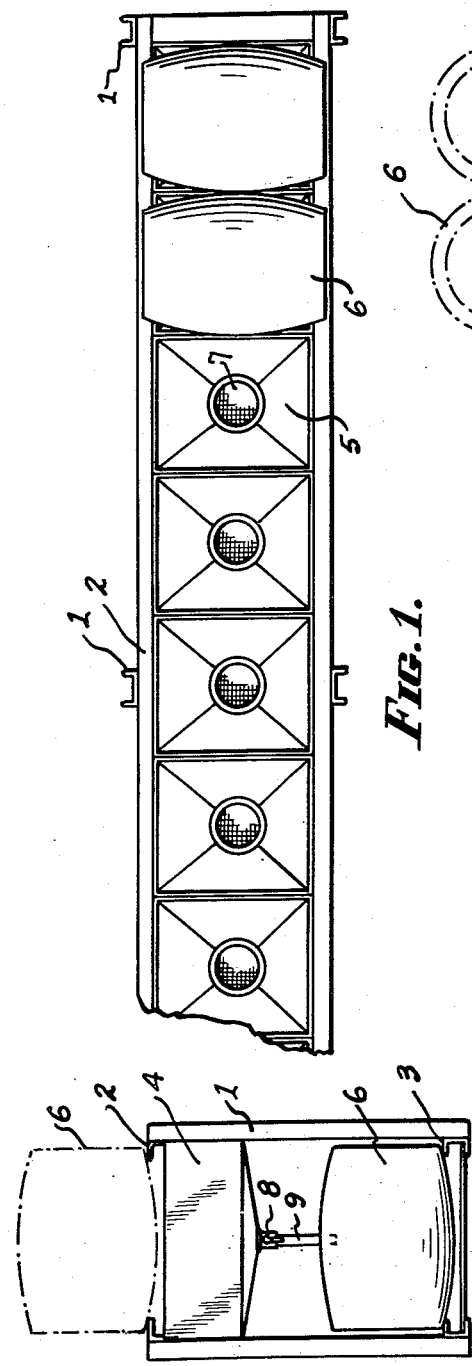
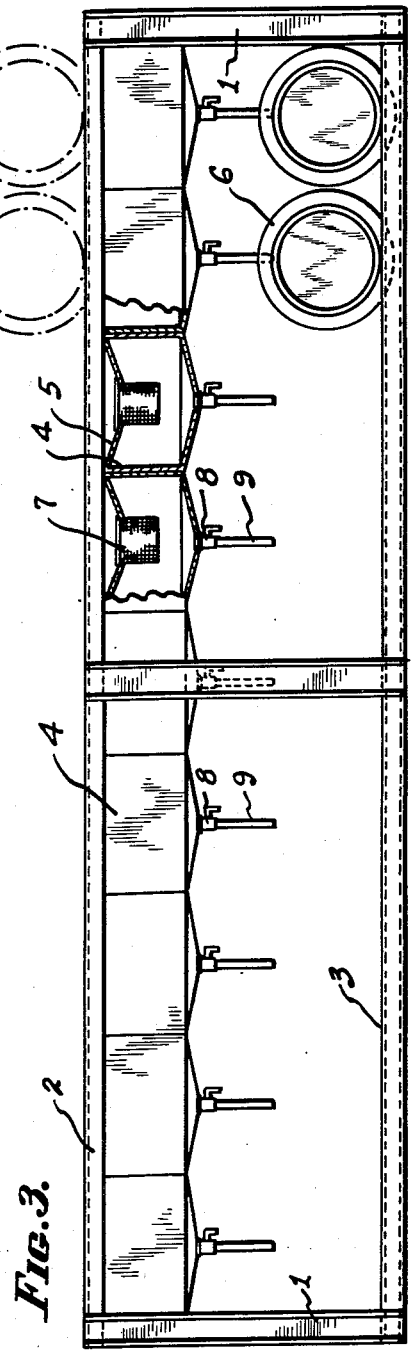
INVENTOR.
HARRY SEIBEL.
BY
ATTORNEYS.

Patented Dec. 5, 1939

2,182,681

UNITED STATES PATENT OFFICE 2,182,681

APPARATUS AND METHOD OF REGAUGING DISTILLED SPIRITS

Harry Seibel, Lawrenceburg, Ind.

Applicaton September 7, 1937, Serial No. 162,650

3 Claims. (Cl. 73—51)

My invention relates to a novel method and the apparatus used therewith for regauging distilled spirits.

When distilled spirits are to be placed in bond the storekeeper gauger at the distillery proceeds as follows to determine the proof gallons: The weight (tare) of the empty cask will be determined immediately preceding the filling of the same in all cases. The tare, or weight of the empty cask or package will be marked on the package as soon as ascertained. When the cask or package has been filled, the gross weight will be ascertained in pounds and half pounds, except as hereinafter provided in the case of small packages of alcohol, and the net weight determined by subtracting the tare from the gross weight.

The proof of all spirits below 150 proof must be carefully ascertained before the gross weighing and each cask must be filled to capacity. By means of tables giving correction factors the wine gallons at 60° F. is then determined. The capacity of the package is then cut into a stave adjacent the bung hole and on one of the beads.

No tax is payable on distilled spirits being stored in a bonded warehouse but when it is removed further weighings are required. It is at this time that the tax is paid on the basis of weight and proof of the spirits.

At the time of removal from the bonded warehouse to the bottling or filling department, the operation for determining the amount on which the tax must be paid is called regauging. This regauging is ordinarily calculated, due allowance being made for the soakage of the spirits into the wood during the aging process in the bonded warehouse.

The rules permit regauging as follows: The contents of each package to be regauged for withdrawal may be temporarily removed to a separate vessel (usually a paraffined cask) and the empty cask weighed to determine the actual increase in weight by reason of the absorption of spirits, if any has occurred. The proprietor of the warehouse is required to furnish the help necessary to remove the spirits from the cask and return the same thereto.

Ordinarily such labor has been so costly that proprietors have considered it preferable to adopt a method of calculating the increase in the weight due to soakage. The department furnishes a schedule of soakage poundage allowances, or increase in tare, based on the time the spirits have been in bond. Thus the tables allow soakage increase in tare weights of from three to fourteen pounds based on the time the spirits have been in bond. Further allowance may be made for leakage and evaporation where it appears that this has occurred without the fault of the proprietor.

It is the object of my invention to provide a method and apparatus for taking actual tares during the regauging which will be simple, accurate and effective and which will result in very material savings. The schedule of soakage, leakage and evaporation losses in the government schedule were determined at some time in the past when the wood of the packages was drier and less porous. Consequently, having determined that the actual loss by soakage averaged several pounds per package more than the allowance in the government schedules, it was my object to devise apparatus by the use of which actual tares could be accurately and inexpensively determined.

In the drawing I have illustrated suitable apparatus for accurately determining the actual tare weight of packages during the regauging operation wherein:

Figure 1 is a plan view of the apparatus.

Figure 2 is a side elevation.

Figure 3 is an end elevation.

Mounted on upright supports 1 I have shown an upper barrel runway 2 and lower barrel runway 3. The runways are formed from wooden or metal rails spaced sufficiently far apart to suit the bulge in the casks or barrels rolled on them. The runways are vertically spaced sufficiently far apart to accommodate a series of tanks 4 each having a capacity of about sixty gallons, and with sufficient space below the tanks for holding a series of casks. The tanks have open centered aprons or guards 5 so constructed and arranged that when a cask such as is indicated in dotted lines at 6 is positioned and drained there will be a minimum of splashing. Within the annular center openings in the aprons there are removable strainers 7, so that any wood or chips will be strained off. The bottoms of the tanks 4 are funnel shaped, and provided with valves 8 and discharge spouts 9.

The operation of regauging is accomplished by rolling a series of casks onto the upper runway over the respective splash aprons. The bungs are then removed and the packages drain into the respective tanks, any charcoal or chips being trapped in the the strainers. The packages are then individually weighed tare together with any charcoal or chips which are caught in the respective strainers. The new tare weight is marked on each package and then each package is placed under the tank containing the previous contents and the spirits from each package drained back into its original package. While the package is open prior to draining, hydrometers are inserted which determine the proof of the spirits.

The gross weight minus the new tare weight with the hydrometer readings and temperature is then reduced by referring to conversion tables to the number of proof gallons of spirits on which the $2.00 per gallon tax is based.

I have shown a regauging stand containing nine units though a more or less number of units may be incorporated.

Remarkable savings occur in the labor of handling and weighing the packages, because the movement of the packages is carried out in a continuous series of group movements. There is no delay therefor while any one individual package is being drained. The regauging can practically be carried out at an inconsequential expense.

As an example of the savings in tax paid, in a lot of 100 casks regauged, I have found as high an average in actual tare over the tare which would have been determined in accordance with the government soakage allowance of as much as three pounds per package. Thus on one hundred casks I have saved as much tax as 50 gallons times the $2.00 per gallon tax or $100.00. The savings in a year's operations are very material.

In the use of the invention a series of spirit packages, such as are indicated at 6, are moved in a position where the series of packages may be individually emptied, each into a tank 4 directly underlying the position in which the package is placed. By gravity the contents of the package 6 flow into the tanks 4, the contents of each package being thus isolated in a tank 4. During the emptying of the packages all sediment is strained out by means of a strainer 5. Each of the individual empty packages, together with the sediment strained therefrom, is then weighed following which it is placed in position underneath the particular discharge spout 9 of the tank 4, which contains the spirit, which each original package contained, prior to emptying. Upon opening the valves 8, the original contents of each package is redischarged back into such package. The weight of the full package minus the tare weight of the empty package, plus the sediment recovered, accurately determines the weight of the contents of the package upon which the tax is paid.

The process of regauging is ordinarily carried out in a series of operations. With an apparatus, such as is indicated in the figures, four packages are placed on the run, as shown on the right of the side elevational view of Figure 2. While these packages are draining respectively into the tanks 4, another series of 5 packages is positioned on the stand to the left, as indicated in the side elevational view and including the middle position. Thus a sequence of operations can be established.

Another way of handling the operation is for one man to place the casks in position for draining, while another man removes the drained casks, weighs them, and then places them in position to receive the original contents, less the sediment.

While the regauging of individual casks has in the past been accomplished by draining a cask into a paraffined cask and then weighing the empty cask prior to restoring the original contents with the resultant loss of time of the operator waiting for the cask to drain, as far as I am advised no one has suggested a method by which the regauging operations may be carried out in a series of group movements wherein the labor cost has been so reduced that material savings may be affected.

Having thus described my invention, what I claim as new and desire to secure by Letters Patent is:

1. Apparatus for regauging spirits comprising an elevated support comprising an upper runway for receiving a series of filled spirit packages, an underneath runway for receiving said series of packages after they have been emptied and weighed, a series of spaced tanks supported between said runways, each having sufficient capacity for holding the contents of a package, said tanks provided with antisplashing aprons, and detachable strainer means associated with said aprons.

2. Apparatus for regauging spirits comprising means for receiving a series of filled spirit packages and maintaining them in spaced position for drainage, means spaced below said first noted means for receiving said series of packages after they have been emptied and weighed, and means intermediate said first noted and second noted means for receiving the contents individually of each of the spirit packages on said first noted means, said last noted means being provided with means for preventing splashing having detachable strainers associated therewith.

3. A method of regauging spirits which comprises moving a series of spirit packages into position where the packages may be individually emptied into a series of containers, emptying by a gravity flow the spirit packages into the containers, straining out any sedimentary material during the emptying operation, individually weighing each package together with the sediment strained therefrom, and then moving the packages under said containers each under that container which received its contents and draining the original contents of each package back into its respective package, the movement of said packages during the operations being in a continuous sequence whereby delay during draining operations is avoided.

HARRY SEIBEL.